United States Patent
Adkins et al.

(10) Patent No.: US 8,089,652 B2
(45) Date of Patent: Jan. 3, 2012

(54) LICENSING METHOD FOR USE WITH AN IMAGING DEVICE

(75) Inventors: Christopher Alan Adkins, Lexington, KY (US); Timothy Strunk, Lexington, KY (US); John Dennis Zbrozek, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 135 days.

(21) Appl. No.: 12/539,675

(22) Filed: Sep. 14, 2009

(65) Prior Publication Data

US 2010/0195133 A1    Aug. 5, 2010

Related U.S. Application Data

(62) Division of application No. 10/334,660, filed on Dec. 30, 2002, now Pat. No. 7,589,850.

(51) Int. Cl.
*G06F 3/12* (2006.01)
*G06K 15/00* (2006.01)

(52) U.S. Cl. ...................................... 358/1.15; 358/1.14

(58) Field of Classification Search ............. 358/1.5, 358/1.12, 1.13, 1.14, 1.15, 1.1, 1.9, 1.16, 358/1.17, 1.18, 400, 401, 404, 407, 444, 358/468, 504, 406; 399/8, 9, 12, 13, 24; 347/5, 7, 15, 19, 23; 705/50, 51, 52, 59, 705/60, 61, 62, 63, 64, 67, 14.23, 13, 14.1, 705/14.51, 902, 317; 382/100, 104, 105
See application file for complete search history.

(56) References Cited

U.S. PATENT DOCUMENTS

| | | | |
|---|---|---|---|
| 4,961,088 A | 10/1990 | Gilliland et al. |
| 5,132,729 A | 7/1992 | Matsushita et al. |
| 5,137,379 A | 8/1992 | Ukai et al. |
| 5,155,664 A | 10/1992 | Holterman et al. |
| 5,410,641 A | 4/1995 | Wakabayashi et al. |
| 5,491,540 A | 2/1996 | Hirst |
| 6,039,430 A | 3/2000 | Helterline et al. |
| 6,062,669 A | 5/2000 | Lee |
| 6,065,824 A | 5/2000 | Bullock et al. |
| 6,113,208 A | 9/2000 | Bengamin et al. |
| 6,116,717 A | 9/2000 | Anderson et al. |
| 6,126,265 A | 10/2000 | Childers et al. |
| 6,144,812 A | 11/2000 | Ueno |
| 6,145,959 A | 11/2000 | Lund et al. |
| 6,158,850 A | 12/2000 | Cook |
| 6,161,913 A | 12/2000 | Childers et al. |

(Continued)

FOREIGN PATENT DOCUMENTS

JP      2000-127558 A      9/2000

(Continued)

*Primary Examiner* — Dov Popovici

(57) ABSTRACT

A licensing method includes the steps of establishing a licensing vendor; providing an imaging device that uses an imaging media in forming printed images on print media, the imaging media including an initial supply amount of an imaging substance; associating a usage license with at least one of the imaging device and the imaging media, the usage license defining a first usage threshold at which a consumer is prompted to acquire a new license; and providing a license monitoring mechanism communicatively coupled with the imaging device, the license monitoring mechanism performing the steps of tracking an amount of usage of the imaging media by the imaging device; determining whether the amount of usage of the imaging media by the imaging device has reached a usage threshold; and upon reaching the usage threshold, then prompting the consumer to acquire the new license from the licensing vendor.

5 Claims, 12 Drawing Sheets

U.S. PATENT DOCUMENTS

| | | |
|---|---|---|
| 6,161,915 A | 12/2000 | Bolash et al. |
| 6,163,658 A | 12/2000 | Suzuki |
| 6,181,885 B1 | 1/2001 | Best et al. |
| 6,188,852 B1 | 2/2001 | Ojima et al. |
| 6,196,670 B1 | 3/2001 | Saruta |
| 6,219,153 B1 | 4/2001 | Kawanabe et al. |
| 6,226,025 B1 | 5/2001 | Kim |
| 6,227,638 B1 | 5/2001 | Childers et al. |
| 6,227,643 B1 | 5/2001 | Purcell et al. |
| 6,263,170 B1 | 7/2001 | Bortnem |
| 6,264,301 B1 | 7/2001 | Helterline et al. |
| 6,267,463 B1 | 7/2001 | Paulsen et al. |
| 6,290,321 B1 | 9/2001 | Murray et al. |
| 6,299,274 B1 | 10/2001 | Bolash et al. |
| 6,305,795 B2 | 10/2001 | Childers et al. |
| 6,332,062 B1 | 12/2001 | Phillips et al. |
| 6,345,891 B1 | 2/2002 | Childers et al. |
| 6,351,618 B1 | 2/2002 | Pollocks, Jr. |
| 6,351,621 B1 | 2/2002 | Richards et al. |
| 6,363,226 B1 | 3/2002 | Batori |
| 6,366,742 B1 | 4/2002 | Reihl et al. |
| 6,371,586 B1 | 4/2002 | Saruta |
| 6,375,298 B2 | 4/2002 | Purcell et al. |
| 6,375,301 B1 | 4/2002 | Childers et al. |
| 6,385,407 B1 | 5/2002 | Inose |
| 6,512,894 B2 * | 1/2003 | Takemoto et al. ............... 399/12 |
| 7,589,850 B2 * | 9/2009 | Adkins et al. ................ 358/1.15 |
| 2001/0005457 A1 | 6/2001 | Serizawa |
| 2001/0007458 A1 | 7/2001 | Purcell et al. |
| 2001/0016123 A1 | 8/2001 | Yoshimura |
| 2001/0028800 A1 | 10/2001 | Kim |
| 2002/0012541 A1 | 1/2002 | Takemoto et al. |
| 2002/0018657 A1 | 2/2002 | Serizawa |
| 2002/0021906 A1 | 2/2002 | Yoshizaki et al. |
| 2002/0024559 A1 | 2/2002 | Murray et al. |
| 2002/0025173 A1 | 2/2002 | Isobe et al. |
| 2002/0030712 A1 | 3/2002 | Silverbrook |
| 2002/0030713 A1 | 3/2002 | Silverbrook |
| 2002/0031357 A1 | 3/2002 | Watanabe et al. |
| 2002/0031359 A1 | 3/2002 | Karakama et al. |
| 2002/0064389 A1 | 5/2002 | Semma et al. |

FOREIGN PATENT DOCUMENTS

| | | |
|---|---|---|
| JP | 2000-132068 A | 12/2000 |
| JP | 2002-006702 A | 11/2002 |

* cited by examiner

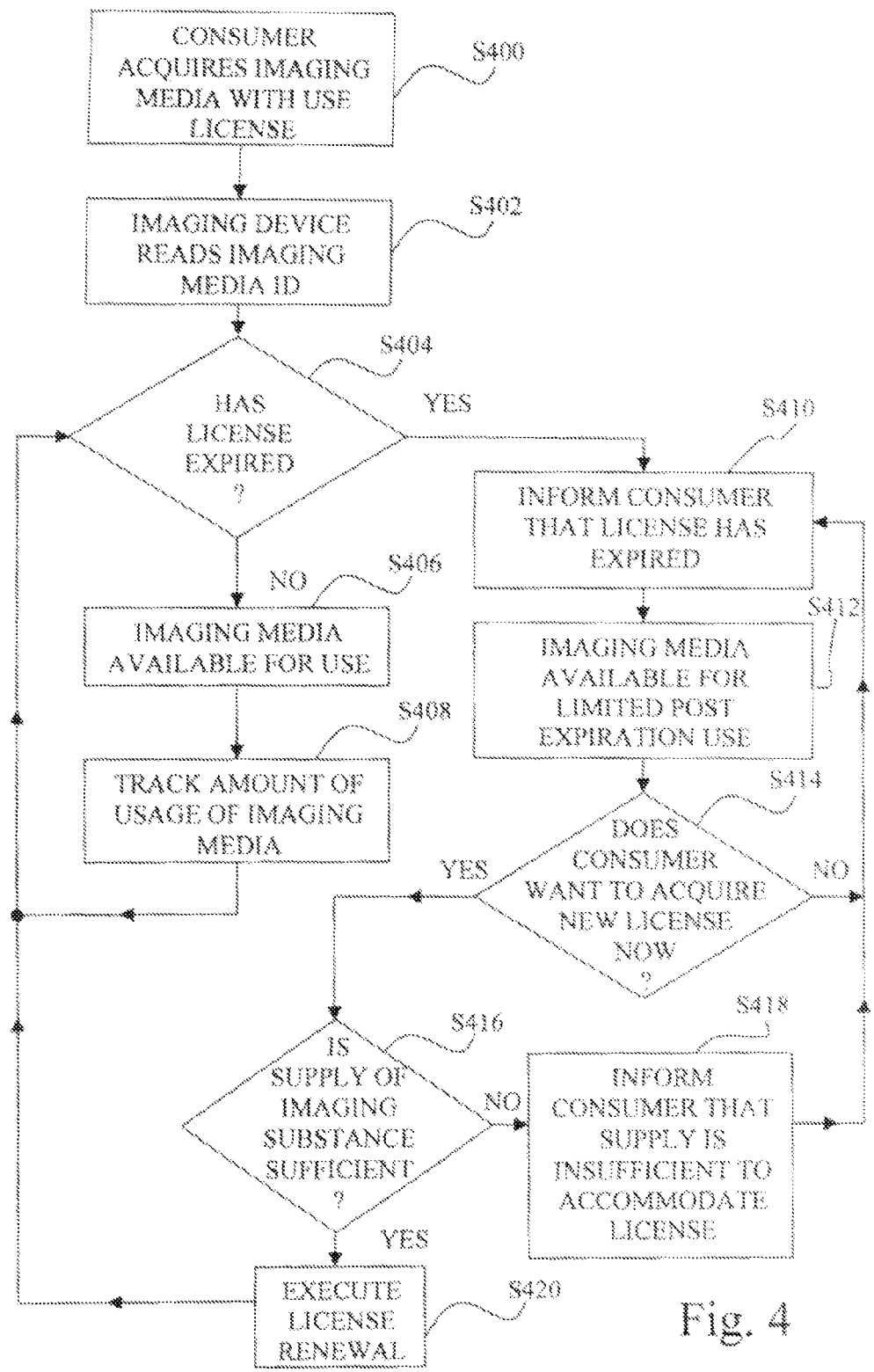

LICENSING METHOD FOR USE WITH AN IMAGING DEVICE

BACKGROUND OF THE INVENTION

1. Field of the Invention

The present invention relates to renewing an available imaging substance supply for use by an imaging device, and, more particularly, to a licensing method for use with an imaging device and/or imaging media.

2. Description of the Related Art

An imaging device typically has associated therewith an imaging media, such as for example, an ink supply tank, an ink jet cartridge, a toner tank, or electrophotographic process (EP) cartridge, that stores a supply of an imaging substance, such as for example ink or toner, that is consumed during an imaging process. Examples of such an imaging device include an ink jet printer and/or copier, or an electrophotographic printer and/or copier. During imaging with the imaging device, the amount of the imaging substance is depleted. Thus, eventually, once the imaging substance supply of the imaging media is exhausted, the imaging media is either discarded or is re-filled. In either event, the consumer must provide a new supply of imaging substance in order to continue imaging. Typically, the new supply of imaging substance is acquired by the purchase of additional imaging substance, or the purchase of an entirely new imaging media. In either case, the purchasing process can inconvenience the consumer due to inherent delays in the purchasing process. For example, even when a vendor has the item, i.e., imaging substance or imaging media, in stock, the consumer either must go to the vendor to obtain the desired item, or await the delivery of the desired item. Also, proper disposal of spent imaging media can be an inconvenience to a consumer.

What is needed in the art is a licensing method for use with an imaging device and/or imaging media, wherein a consumer can "renew" an available supply of imaging substance, while reducing or avoiding the traditional inconveniences incurred by a consumer following exhaustion of the available imaging substance from the imaging media.

SUMMARY OF THE INVENTION

The present invention provides a licensing method for use with an imaging device and/or imaging media, wherein a consumer can renew an available supply of imaging substance, while reducing or avoiding the traditional inconveniences incurred by a consumer following exhaustion of the available imaging substance from the imaging media. As used in connection with the present invention, the term "consumer" is used to refer to any one or more of a user of the imaging device, such as a home user or a business user, the purchaser of the imaging device and/or imaging media, or the purchaser of a usage license associated with the imaging device and/or imaging media. Also, the terms "license" and "licensing" are used to refer generally to any commerce transaction where a consumer is paying for usage of an imaging device and/or imaging media, which in addition, may be purchased with or without an obligation to return the spent imaging device and/or imaging media to the source thereof at the expiration of the usage term.

The invention, in one form thereof, relates to a licensing method. The licensing method includes the steps to establishing a licensing vendor; providing an imaging device that uses an imaging media in forming printed images on print media, the imaging media including an initial supply amount of an imaging substance; associating a usage license with at least one of the imaging device and the imaging media, the usage license defining a first usage threshold at which a consumer is prompted to acquire a new license; and providing a license monitoring mechanism communicatively coupled with the imaging device. The license monitoring mechanism performs the steps of tracking an amount of usage of the imaging media by the imaging device; determining whether the amount of usage of the imaging media by the imaging device has reached the first usage threshold; and upon reaching the first usage threshold, then prompting the consumer to acquire the new license from the licensing vendor.

In another form thereof, the invention relates to a licensing method including the steps of acquiring an imaging device, the imaging device having a licensing monitoring mechanism and a usage license associated therewith; tracking an amount of usage of the imaging device; determining with the licensing monitoring mechanism whether a consumer wants to acquire a new license; and if the consumer wants to acquire the new license, then the license monitoring mechanism facilitating acquisition of the new license from a licensing vendor.

In still another form thereof, the invention relates to a licensing method, including the steps of acquiring an imaging media having a usage license associated therewith, the imaging media having an initial supply of an imaging substance and a memory storing an identification number for the imaging media, the usage license indicating a licensed amount of the imaging substance; providing a license monitoring mechanism for accessing the memory of the imaging media and reading the identification number for the imaging media; tracking an amount of usage of the imaging media, the amount of usage of the imaging media being related, at least in part, to at least one of an amount of consumption of the imaging substance and a rate of consumption of the imaging substance; and the license monitoring mechanism determining whether the usage license has expired, the determination being based on a comparison of a first value representing the licensed amount of the imaging substance with a second value representing the amount of usage of the imaging media.

In still another form thereof, the invention relates to an imaging device. The imaging device includes an electronics unit, and an imaging recording unit communicatively coupled to the electronics unit. An imaging media carries a supply of imaging substance. The imaging media includes a memory, the memory being communicatively coupled to the electronics unit. The memory includes storage locations for storing an identification number of the imaging media, a first value representing a licensed amount of the imaging substance and a second value representing an amount of usage of imaging media. The electronics unit includes a communications interface for facilitating communications with an imaging device driver; an embedded processor communicatively coupled to the communications interface; an imaging recording unit interface communicatively coupled to each of the embedded processor, the image recording unit and the memory; a counter communicatively coupled to each of the embedded processor and the imaging recording unit interface; an encryption key storage module; and an embedded license authentication system (ELAS) communicatively coupled to each of the communications interface, the counter, the imaging recording unit interface and the encryption key storage module. The ELAS is programmed for performing the steps of: accessing the memory of the imaging media and reading the identification number for the imaging media, the first value and the second value; tracking the amount of usage of the imaging media; and determining whether the usage license has expired, the determination being based on a comparison of the first value representing the licensed amount of the imaging substance with the second value representing the amount of usage of imaging media.

In still another form thereof, the invention relates to a licensing method including the steps of providing an imaging device having associated therewith a usage license for a set amount of usage, the imaging device having an embedded license authentication system (ELAS); providing a host on which an imaging driver for the imaging device is installed; the ELAS sending a message to the imaging driver that the usage license is expiring, and indicating to the imaging driver an amount of imaging substance remaining in the imaging media; the ELAS initiating a limited post-expiration use provision permitting limited post expiration use of the imaging device; the imaging driver generating a warning message that prompts a consumer to purchase a new license via an e-commerce website of a licensing vendor, the warning message being displayed at the host; the ELAS forwarding a license renewal request secured by a secure encryption key to the e-commerce website of the licensing vendor; the licensing vendor sending to the ELAS of the imaging device an encrypted reply message, the encrypted reply message including a new license; and the ELAS decrypting the encrypted reply message, and enabling imaging operations performed by the imaging device and the imaging media for a duration of the new license.

In still another form, the invention relates to a licensing method including the steps of providing an imaging device having an embedded license authentication system (ELAS); providing an imaging media for use with the imaging device, the imaging media having a usage license associated therewith, the imaging media including a memory for storing information associated with the imaging media, the information including an imaging media type, an imaging substance fill level of the imaging media, and a usage amount of the imaging media, the usage amount being represented by a plurality of usage bits, each bit representing an amount of use of imaging substance from the imaging media; the ELAS accessing the memory to read the information associated with imaging media; the ELAS setting an license identification number (ID) corresponding to the usage license associated with the imaging media; and the ELAS maintaining a count representing a usage of the imaging media. When the count achieves a value corresponding to a usage level for the imaging media, the ELAS sets an appropriate usage bit of the plurality of usage bits in the memory. When at least a portion of the plurality of usage bits are set, thereby indicating the usage license has expired, the ELAS goes into a limited post-expiration use mode, wherein during the limited post-expiration use mode a gradual reduction of a density of printed images occurs.

In still another form thereof, the invention relates to a license authentication method for use with an imaging device. The method includes the steps of determining an imaging media identification (ID) of an imaging media, and determining whether a license has been issued corresponding to the imaging media ID of the imaging media.

In still another form thereof, the invention relates to a license authentication method, including the steps of determining that an imaging media has been installed in an imaging device; reading imaging media usage data stored in an imaging media memory of the imaging media; determining whether a first use of the imaging media has expired; and determining whether an imaging media identification (ID) of the imaging media is new to the imaging device.

An advantage of the present invention is that a consumer can renew an available supply of imaging substance without leaving their home or place of business.

Another advantage of the present invention is that a consumer can renew an available supply of imaging substance for use with an imaging device substantially immediately after acquiring a new license via an e-commerce transaction, or alternatively, via a telephone transaction.

Another advantage of the present invention is that a consumer can renew an available supply of imaging substance without the traditional inconvenience and/or mess associated with changing out an imaging media container, or with refilling the imaging media with a new supply of imaging substance.

Another advantage of the present invention is that a consumer is given a grace period, referred to herein as "limited post-expiration use", wherein imaging can continue with the imaging device following expiration of the usage license.

Another advantage of the present invention is that a consumer is given multiple opportunities to conveniently acquire a new license following expiration of the current usage license.

Yet another advantage, in some embodiments of the present invention, is that a warning is provided to the consumer that the current usage license is close to expiring.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4 is a more detailed flowchart directed to a second embodiment of the invention;

FIGS. 8A and 8C form a flowchart of another embodiment of a license authentication method of the present invention.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
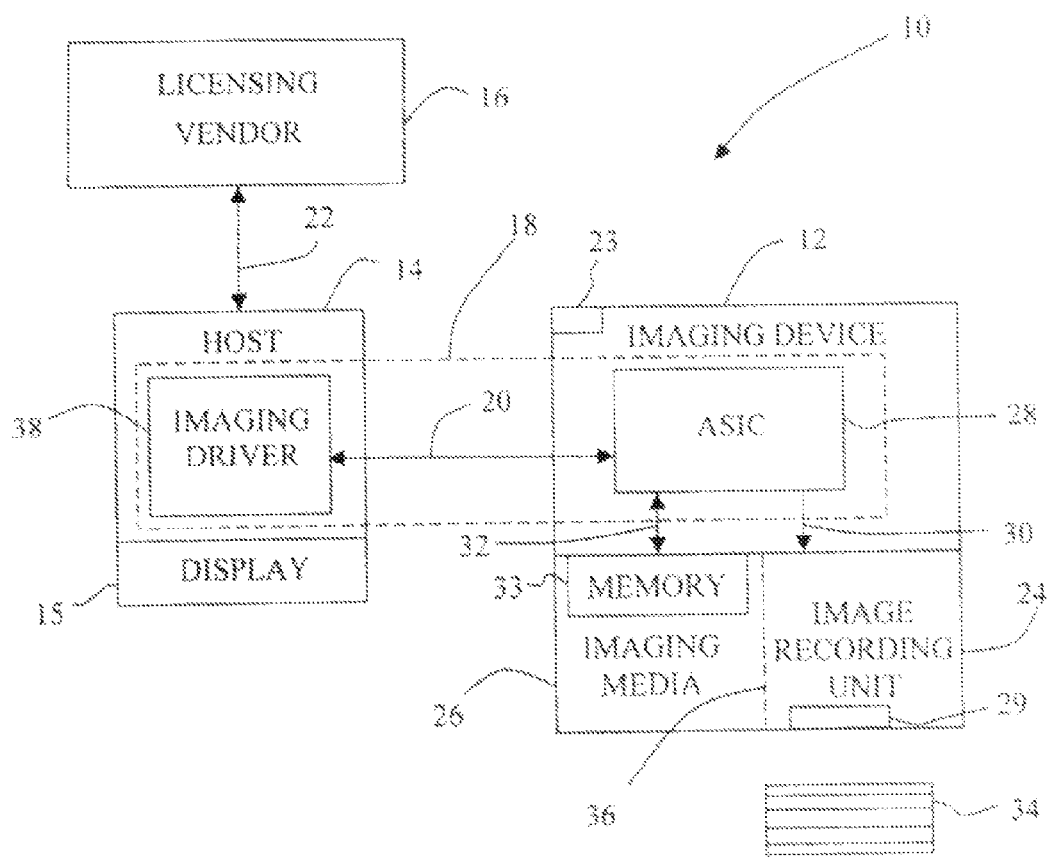
FIG. 1 is a diagrammatic depiction of a system for implementing a licensing method of the present invention.

Referring now to the drawings, and particularly to FIG. 1, there is shown a diagrammatic depiction of a system 10 for implementing the licensing method of the present invention. System 10 includes an imaging device 12, a host 14, a licensing vendor 16 and a license monitoring mechanism 18. Imaging device 12 communicates with host 14 via a communications link 20. Licensing vendor 16 communicates with host 14 via a communications link 22.

Imaging device 12 includes a user interface 23, an image recording unit 24, an imaging media 26 and an Application Specific Integrated Circuit (ASIC) 28. ASIC 28 communicates with image recording unit 24 via a communications link 30. ASIC 28 communicates with imaging media 26 via a communications link 32. Imaging device 12 can be, for example, an ink jet printer and/or copier, or an electrophotographic printer and/or copier.

In the context of the examples for imaging device 12 given above, image recording unit 24 can be, for example, an ink jet printhead unit or an electrophotographic printing unit, and includes an imaging head 29 used for forming an image on a substrate 34, such as a sheet of print media or a photoconductive member. For convenience, each type of substrate 34 will be referred to by the element number 34, for example, print media 34. Imaging media 26 can be, for example, an ink supply tank, an ink jet cartridge, a toner tank, or an electrophotographic process (EP) cartridge, each of which containing a supply of an imaging substance, such as for example ink or toner, that is consumed during an imaging process. Imaging device 12 uses the imaging substance contained in imaging media 26 to form an image on print media 34. Print media 34 can be, for example, sheets of paper, fabric or transparencies.

Those skilled in the art will recognize that image recording unit 24 and imaging media 26 may be formed as individual discrete units, or may be combined in an integral unit, these options being depicted by dashed line 36.

Preferably, imaging media 26 has mounted thereto a memory 33 for storing information relating to imaging media 26, such as for example, an imaging media identification number, a value representing an initial amount of the imaging substance contained in imaging media 26, a value representing a licensed amount of the imaging substance contained in imaging media 26, and a value representing an amount of usage of imaging media 26.

In one configuration of memory 33, for example, memory 33 includes sixteen bits. Two bits are reserved for the imaging media identification number, which is set by the manufacturer. Two bits represent the fill level, i.e., the initial amount of the imaging substance contained in imaging media 26. Two bits represent the type of the imaging media, e.g., the type of imaging head 29. Five bits are used as a usage gauge to maintain a record of usage of imaging media 26. And, five bits are used to identify the usage license, and can include an identification that, in a preferred embodiment, is randomly selected and includes an indication of the licensed amount of usage.

By attaching memory 33 to imaging media 26, in essence, a usage license associated with imaging media 26 can travel with imaging media 26 from one imaging device to another. The licensed amount of usage may be represented in a variety of forms, such as for example, by the amount of imaging substance consumed from imaging media 26, the number of imaging dots formed on print media 34, the percent of image coverage on the printed sheets of media 34, the number of printed sheets of imaging media 26, the number of printed sheets of imaging media 26 exceeding a predetermined coverage amount, or simply the number of imaging operations performed by imaging device 12. An alternative approach would be to base the usage license on a fixed time duration.

In practicing the present invention, preferably, the initial supply amount (fill level) of imaging substance contained in imaging media 26 is greater than the licensed amount of the imaging substance. For example, in one implementation of the invention, the initial supply amount of the imaging substance contained in imaging media 26 can be, for example, at least two times greater than the licensed amount. It is important to note, however, that while the initial amount of imaging substance supplied with imaging device 12 and/or imaging media 26 is more than sufficient to accommodate one or more license renewals, the consumer has been required to pay only for the licensed amount at the time of the original purchase.

Host 14 may be, for example, a personal computer including a display device 15, an input device (e.g., keyboard), a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 38 for imaging device 12. Imaging driver 38 is in communication with ASIC 28 of imaging device 12 via communications link 20. Imaging driver 38 serves to facilitate communications between imaging device 12 and licensing vendor 16. In addition, imaging driver 38 serves in the traditional roll of providing formatted print data to imaging device 12.

Licensing vendor 16 provides to a consumer access to a new usage license, the concept of which being more fully described below. However, in summary, in the licensing method of the invention, a usage license is associated with at least one of imaging device 12 and imaging media 26, and when the usage of imaging device 12 and/or imaging media 26 has reached a predefined usage threshold, the consumer is prompted to acquire a new license from licensing vendor 16. This predefined usage threshold can, for example, represent a usage amount that is associated with the license being close to expiring, or a usage amount associated with license expiration. In a preferred method of the invention, licensing vendor 16 has an e-commerce website which can be accessed by a consumer via on-line communications over the Internet to acquire the new license.

Communications link 20 may be established by a direct cable or optical connection, or by a network connection such as for example an Ethernet local area network (LAN). Communications links 30 and 32 may be established by using standard electrical cabling or bus structures.

Communications link 22 is preferably established by an Internet connection, or via a wide area network (WAN). Alternatively, however, communications link 22 graphically represents a communication by a consumer who physically visits the premises of licensing vendor 16, or a telephone link to licensing vendor 16.

License monitoring mechanism 18 is a functional unit that may reside in either of imaging device 12 or host 14, or may reside in a combination of imaging device 12 and a host 14, these options being depicted by the dashed line representing license monitoring mechanism 18. In a preferred embodiment, license monitoring mechanism 18 is resident in the combination of ASIC 28 of imaging device 12 and imaging driver 38 of host 14. In general, license monitoring mechanism 18 tracks an amount of usage of imaging media 26 by imaging device 12, determines whether the amount of usage of imaging media 26 by imaging device 12 has reached a usage threshold, and upon reaching the usage threshold, then prompting the consumer to acquire a new license. Where a consumer desires an on-line e-commerce acquisition of the new license, license monitoring mechanism 18 initiates and establishes communications with licensing vendor 16 for acquiring the new license.

The usage license may be structured to require a combination of a particular imaging device, such as imaging device 12, and a particular imaging media, such as imaging media 26. Such a combination can be verified by the identification numbers associated with the imaging device and imaging media. Alternatively, the license may be structured such that the license only applies to a particular imaging device or to a particular imaging media.

Figure 2:
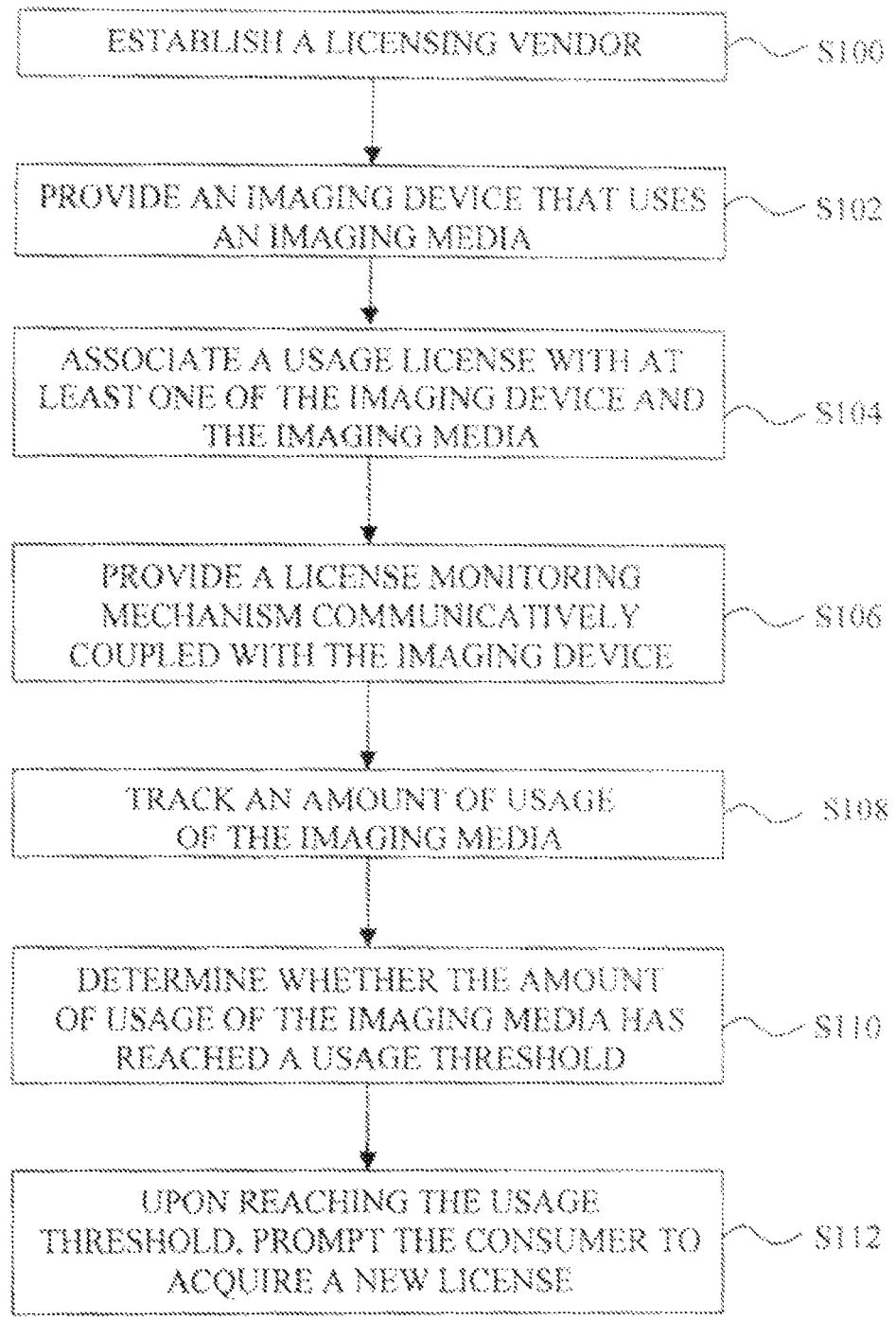
FIG. 2 is a general flowchart of a licensing method of the present invention.

FIG. 2 is a general flowchart of one licensing method of the present invention, which will be described in conjunction with FIG. 1.

At step S100, licensing vendor 16 is established. Preferably, licensing vendor 16 includes a website and a computer having a database that accommodates the remote acquisition of a new license, sometimes also referred to as a licensing renewal, without the consumer having to leave their home or place of business. However, alternatively, it is contemplated licensing vendor 16 may be a licensing outlet center, such as a retail store, that can provide information for a license renewal via a site visit by the consumer, or via the telephone.

At step S102, imaging device 12 is provided that uses imaging media 26 in forming printed images on print media 34. The imaging media includes an initial supply of an imaging substance, such as ink or toner.

At step S104, a usage license is associated with at least one of imaging device 12 and imaging media 26. The usage license defines a first usage threshold at which a consumer is prompted to acquire a new license. This prompting may include determining whether the consumer wants to acquire the new license by displaying a query message at one or both of user interface 23 of imaging device 12 and display 15 of host 14.

At step S106, license monitoring mechanism 18 is provided communicatively coupled with imaging device 12. Preferably, this provision is made by the manufacturer of imaging device 12 and/or imaging driver 38. License monitoring mechanism 18 then proceeds to perform steps S108, S110 and S112.

At step S108, an amount of usage of imaging media 26 by imaging device 12 is tracked. This tracking may be based, for example, on the number of imaging dots formed on print media 34; on the number of imaging dots formed on print media 34 as compensated for by such factors as temperature, humidity and time; the percent of image coverage on the printed sheets of media 34, the number of printed sheets exceeding a predetermined coverage amount, or simply the number of sheets of print media 34 processed by imaging device 12. Alternatively, this tracking could be based merely on time. Preferably, this usage amount is stored as an updated value in memory 33 that is mounted to imaging media 26.

At step S110, it is determined whether the amount of usage of imaging media 26 by imaging device 12 has reached a usage threshold. Preferably, a plurality of usage thresholds are defined.

At step S112, upon reaching the usage threshold, then the consumer is prompted to acquire a new license from licensing vendor 16. As one aspect of the consumer prompt of step S110, an amount of usage remaining in the usage license may be visually conveyed to the consumer in one or more of a gradual reduction of a density of the printed images, a text message and an illumination of an indicator. Such a prompt serves as a warning to the consumer of the upcoming expiration of the current usage license. As another aspect of the consumer prompt of step S110, where a remote licensing renewal is desired by the consumer, license monitoring mechanism 18 establishes communications with licensing vendor 16 for acquiring the new license. For example, where a consumer desires a remote on-line acquisition of the new license, license monitoring mechanism 18 establishes communications with licensing vendor 16 for acquiring the new license via the Internet.

Figure 3A:
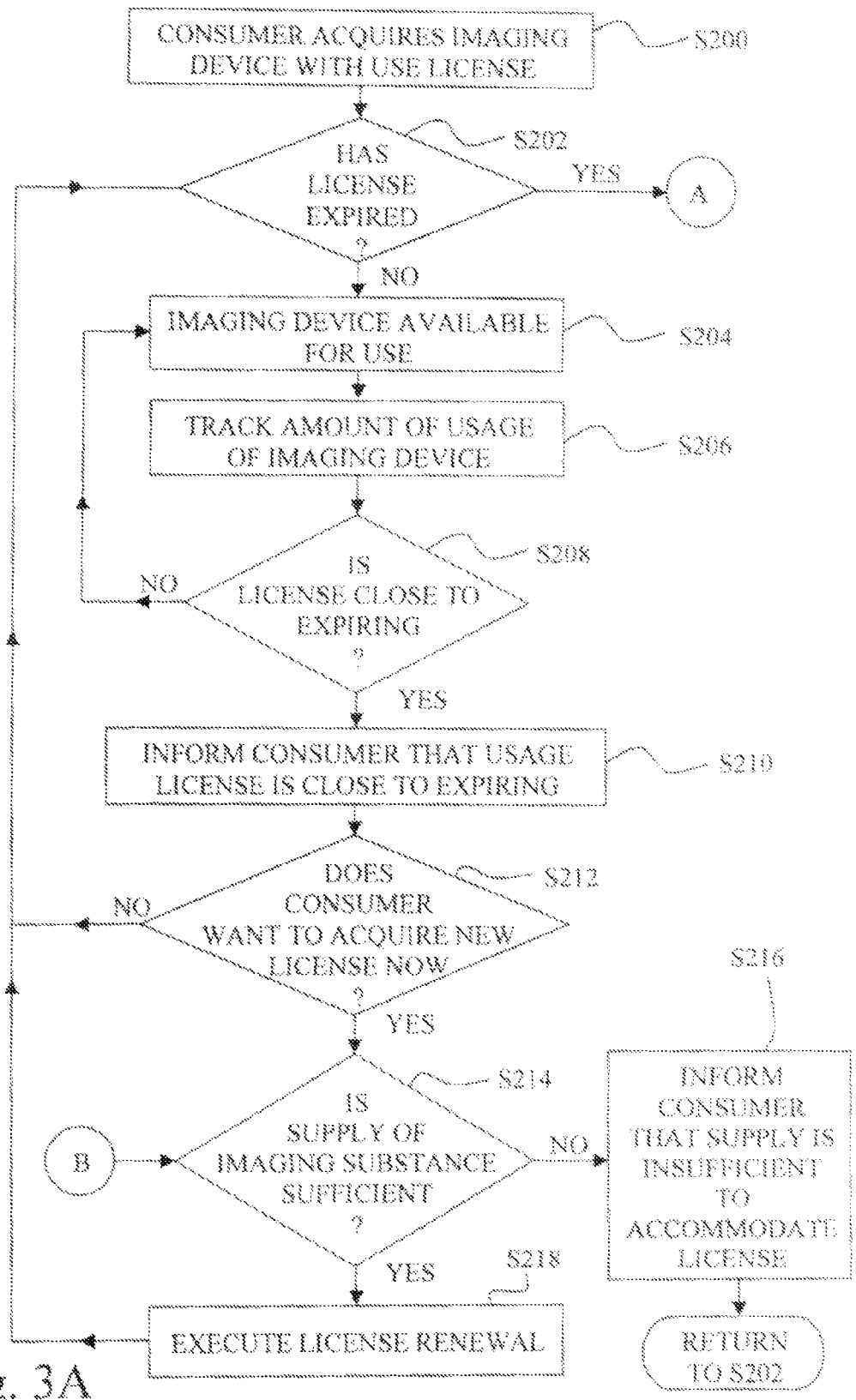
FIGS. 3A and 3B form a more detailed flowchart directed to one embodiment of the invention.
Figure 3B:
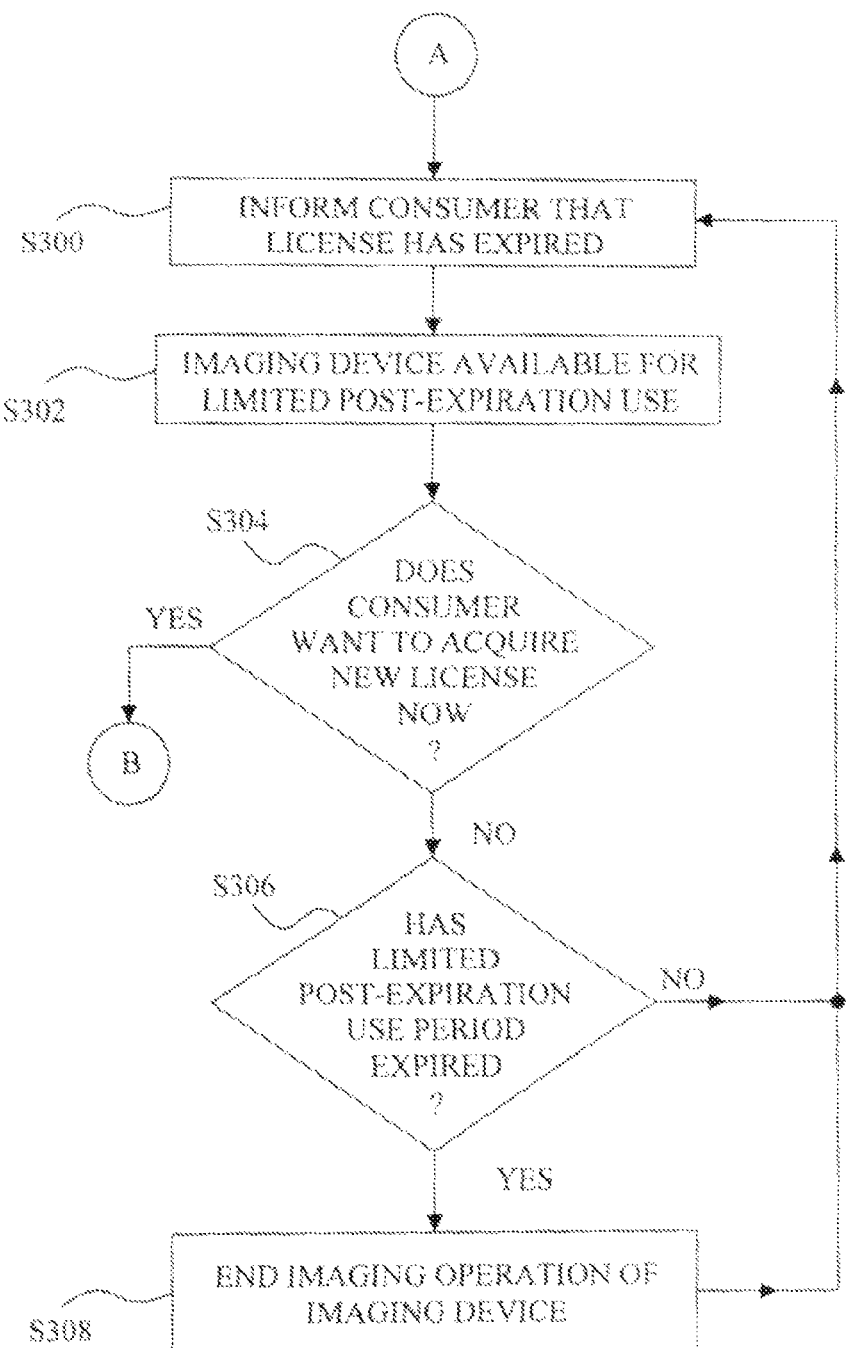

FIGS. 3A and 3B represent a more detailed flowchart directed to one embodiment of the invention. The portion of the flowchart of FIG. 3A is directed generally to the situation where the usage license has not yet expired, whereas the portion of the flowchart of FIG. 3B is directed generally to the situation where the usage license has expired.

At step S200, a consumer acquires imaging device 12 having a usage license associated therewith. Imaging device may, for example, include an on-board life-time supply of an imaging substance contained in imaging media 26. In any event, however, imaging media 26 will include an initial supply of imaging substance and the usage license will indicate a licensed amount of the imaging substance. The initial supply amount will be greater than the licensed amount. For example, the initial amount may be at least two times greater than the licensed amount.

At step S202, license monitoring mechanism 18 determines whether the usage license has expired. This determination is based, for example, on a comparison of a value representing the licensed amount of the imaging substance with a value representing the amount of usage of imaging media 26. If YES, the process proceeds to step S300 of FIG. 3B; if NO, the process proceeds to step S204.

At step S204, imaging device 12 is considered available for use. This availability means that currently the usage license is not imposing any restrictions on the imaging operations.

At step S206, license monitoring mechanism 18 tracks the amount of usage U1 of imaging device 12. As stated above, this tracking will have some relationship to the amount and rate of consumption of the imaging substance in imaging media 26. This tracking may be based, for example, on the number of imaging dots formed on print media 34; on the number of imaging dots formed on print media 34 as compensated for by such factors as temperature, humidity and time; the percent of image coverage on the printed sheets of media 34, the number of printed sheets exceeding a predetermined coverage amount, or simply the number of sheets of print media 34 processed by imaging device 12. Alternatively, this tracking could be based merely on time. Preferably, this usage amount is stored as an updated value in memory 33 that is mounted to imaging media 26, although the usage amount could be stored at a location remote (i.e., off-board) from imaging media 26.

At step S208, license monitoring mechanism 18 determines whether the usage license is close to expiring. The usage license includes a predefined threshold value VT1 that is associated with a usage amount that will be considered to represent that the usage license is close to expiring. For example, the value VT1 may represent the point when the imaging media has been used for eighty percent of the licensed amount. The usage amount U1 is compared to threshold value VT1. If VT1 is not equaled or exceeded by usage amount U1, then it is determined that the usage license is not close to expiring, and the process returns to step S204. If VT1 is equaled or exceeded by usage amount U1, then it is determined that the usage license is close to expiring, and the process proceeds to step S210.

At step S210, the consumer is informed that the usage license is close to expiring. This warning may be visually conveyed to the consumer in one or more of a gradual reduction of a density of the printed images, or as a text message and/or an illuminated indicator presented at display 15 and/or user interface 23. As a part of this warning, an amount of usage remaining in the usage license is conveyed to the consumer. Upon purchase of a new license, either the amount of the usage remaining will be added to a fixed licensed amount of usage, or alternatively, the price of the new license will be adjusted downwardly based on the amount of usage remaining so that the consumer only purchases the amount of usage necessary to achieve the fixed license usage amount.

At step S212, license monitoring mechanism 18 determines whether the consumer wants to acquire a new license now. This query may be in the form of a text message and/or an illuminated indicator displayed at one or both of display 15 and user interface 23. If the consumer does not want to acquire a new license at that time, then the process returns to step S202. If the consumer does want to acquire a new license at that time, then the process proceeds to step S214.

At step S214, license monitoring mechanism 18 determines whether the current supply of imaging substance in imaging media 26 is sufficient to accommodate a new license, i.e., whether the licensed amount will exceed the current supply amount available from imaging device 12 and/or imaging media 26. The supply amount available may be determined, for example, based on an estimate derived from usage calculations, or alternatively, from the output of an ink level sensor. This query may be in the form of a text message and/or an illuminated indicator displayed at one or both of display 15 and user interface 23. If NO, the process proceeds to step S216 to inform the consumer that the current supply of imaging substance in imaging device 12 and/or imaging media 26 is insufficient to accommodate a new license. Thereafter, the process returns to step S202. If YES, then the process proceeds to step S218.

At step S218, license monitoring mechanism 18 establishes communications with licensing vendor 16 for acquiring the new license. For example, where a consumer desires a remote on-line acquisition of the new license, license monitoring mechanism 18 establishes communications with licensing vendor 16 for acquiring the new license via the Internet. Thereafter, the new license values are retrieved and loaded into memory 33, so that uninterrupted printing can continue. The process then returns to step S202.

If, at step S202, license monitoring mechanism 18 determines that the usage license has expired, then the process proceeds to step S300 (FIG. 3B).

At step S300, license monitoring mechanism 18 informs the user that the license has expired. This information is conveyed to the consumer via a visual warning. One aspect of the warning may be a gradual reduction of a density of the printed images. Another aspect of the warning may be the display of a text message and/or an indicator light at one or both of imaging device 12 or host 14. Such a prompt serves as a warning to the consumer of the expiration of the current usage license.

As step S302, although it has been judged that the current usage license has expired, a grace period, referred to herein as "limited post-expiration use," is provided wherein further imaging operations are not precluded. During the limited post-expiration use, the consumer is continually warned of the imminent ending of imaging operations due to the license expiration, such as for example, by displaying a text message at one or both of display 15 and user interface 23, and/or by the gradual reduction of a density of the printed images that continues until no further images can be generated.

At step S304, license monitoring mechanism 18 determines whether the consumer wants to acquire a new license now. This query may be in the form of a text message and an indicator light displayed at one or both of imaging device 12 and host 14. If the consumer does want to acquire a new license at that time, then the process returns to step S214. If the consumer does not want to acquire a new license at that time, then the process proceeds to step S306.

At step S306, license monitoring mechanism 18 determines whether the duration of the limited post-expiration use has expired. If NO, then the process returns to step S300. If YES, the process proceeds to step S308.

By the time the process proceeds to step S308, the consumer has had numerous opportunities to renew the license. However, for whatever the reason, the consumer has chosen not to acquire a new license. At this time, the reduction of the print density will be at a level such that meaningful printing cannot be continued, and thus, the imaging operations of imaging device 12 for all practical purposes has ended. Alternatively, the imaging operations may be disallowed, such as for example, by not enabling imaging head 29. The process then proceeds back to step S300, wherein license monitoring mechanism 18 again informs the user that the license has expired, the process passes through step S302, since the limited post-expiration use period has expired, and the process then proceeds to step S304 to still again determine whether the consumer wants to acquire a new license.

FIG. 4 represents a more detailed flowchart directed to a second embodiment of the invention.

At step S400, a consumer acquires imaging media 26 having a usage license associated therewith. Imaging media 26 will include an initial supply of imaging substance and the usage license will indicate a licensed amount of the imaging substance. The initial supply amount will be greater than the licensed amount. For example, the initial supply amount may be at least two times greater than the licensed amount.

At step S402, license monitoring mechanism 18 accesses memory 33 of imaging media 26 to read an identification number (ID) assigned to imaging media 26. This step permits license monitoring mechanism 18 to track multiple licenses in situations where multiple different imaging media are periodically swapped in and out of imaging device 12. Once the imaging media ID is read, the process proceeds to step S404.

At step S404, license monitoring mechanism 18 determines whether the usage license has expired. This determination is based on a comparison of a value representing the licensed amount of the imaging substance with a value representing the amount of usage of imaging media 26. If YES, the process proceeds to step S410; if NO the process proceeds to step S406.

At step S406, imaging media 26 is considered available for use. This availability means that currently the usage license imposes no restrictions on the imaging operations based on using imaging media 26.

At step S408, license monitoring mechanism 18 tracks the amount of usage of imaging media 26. This amount of usage of imaging media 26 will have some relationship to the amount and/or rate of consumption of the imaging substance in imaging media 26. This tracking may be based, for example, on the number of imaging dots formed on print media 34, the percent of image coverage on the printed sheets of media 34, the number of printed sheets exceeding a predetermined coverage amount, or merely the number of sheets of media 34 processed by imaging device 12. Preferably, this usage amount is stored as an updated value in memory 33 that is mounted to imaging media 26, although the usage amount could be stored at a location remote (i.e., off-board) from imaging media 26 and associated via the imaging media ID. Thereafter, the process then returns to step S404.

If, at step S404, license monitoring mechanism 18 determines that the usage license has expired, then the process proceeds to step S410.

At step S410, license monitoring mechanism 18 informs the user that the license has expired. This information is conveyed to the consumer via a visual warning. One aspect of the warning may be a gradual reduction of a density of the printed images. Another aspect of the warning may be the display of a text message and/or an illumination of an indicator at one or both of display 15 and user interface 23. Such a prompt serves as a warning to the consumer of the expiration of the current usage license.

As step S412, although it has been judged that the current usage license has expired, a grace period, referred to herein as "limited post-expiration use," is provided wherein further imaging operations are not precluded. During the limited post-expiration use, the consumer is continually warned of the imminent ending of imaging operations due to the license expiration, and the gradual reduction of a density of the printed images can continue until no further images are printed. Alternatively, at the designated end of the limited post-expiration use period, imaging operations of imaging device 12 based on the use of imaging media 26 are prohibited.

At step S414, license monitoring mechanism 18 determines whether the consumer wants to acquire a new license now. This query may be in the form of a text message or an illuminated indicator displayed at one or both of display 15 and user interface 23 of host 14 and imaging device 12, respectively.

If, at step S414, the consumer does not want to acquire a new license at that time, then the process proceeds to step S410, wherein the consumer is again informed that the license has expired. By this time, the consumer has had multiple opportunities to renew the license. However, for whatever the reason, the consumer has chosen not to acquire a new license. By the end of the limited post-expiration use period, the gradation of the print density will be at a level such that meaningful printing cannot be continued, and thus, the imaging operations of imaging device 12 for all practical purposes has ended. The process continues to repeat steps S410 and S414, wherein license monitoring mechanism 18 again informs the user that the license has expired, and the consumer is given further opportunities to acquire a new license.

If, at step S414, the consumer does want to acquire a new license at that time, then the process proceeds to step S416.

At step S416, license monitoring mechanism 18 determines whether the current supply of imaging substance in imaging media 26 is sufficient to accommodate a new license, i.e., whether the licensed amount will exceed the current supply amount available from imaging media 26. The supply amount available may be determined, for example, based on an estimate derived from usage calculations, or alternatively, from the output of an ink level sensor. This query may be in the form of a text message and/or an illuminated indicator displayed at one or both of display 15 and user interface 23. If NO, the process proceeds to step S418 to inform the consumer that the current supply of imaging substance in imaging media 26 is insufficient to accommodate a new license. Thereafter, the process returns to step S410. If YES, then the process proceeds to step S420.

At step S420, license monitoring mechanism 18 establishes communications with licensing vendor 16 for acquiring the new license. For example, where a consumer desires a remote on-line acquisition of the new license, license monitoring mechanism 18 establishes communications with licensing vendor 16 for acquiring the new license via the Internet. License monitoring mechanism 18 then sends to licensing vendor 16 a request for licensing renewal that includes at least one of an identification of the usage license and the imaging media ID of imaging media 26, and any other pertinent security information. Thereafter, upon licensing vendor 16 determining that the request for acquiring a new license is proper, licensing vendor 16 sends, in a secure form, the new license information. License monitoring mechanism 18 then receives the new license information, and the new license values in the new license information are retrieved and loaded into memory 33, so that printing can continue. The process then returns to step S404.

Figure 5:
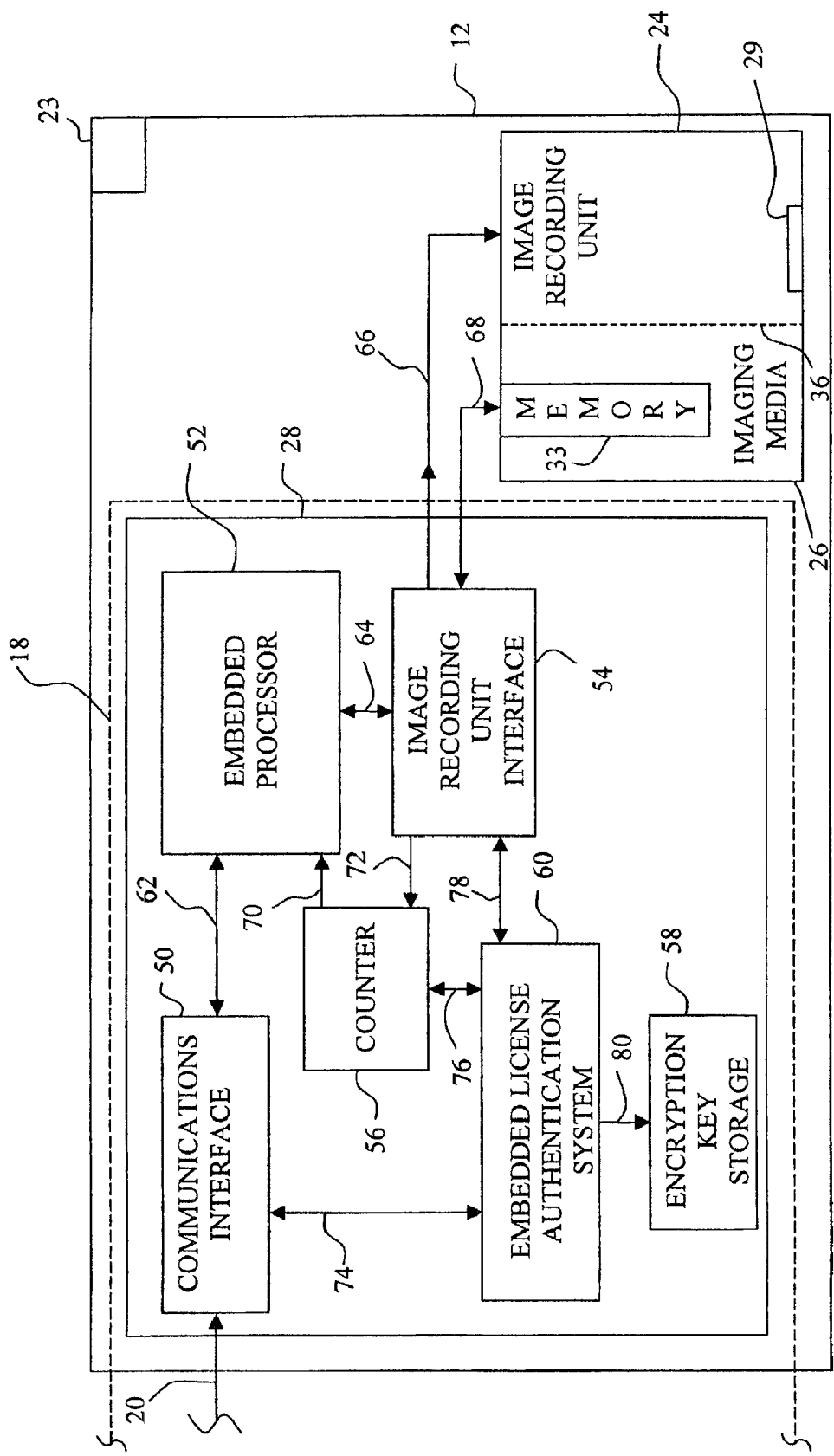
FIG. 5 is a block diagram showing functional blocks of the application specific integrated circuit of FIG. 1.

FIG. 5 is a block diagram showing functional blocks of the ASIC 28 of FIG. 1. ASIC 28 includes a communications interface 50, an embedded processor 52, an imaging recording unit interface 54, a counter 56, an encryption key storage module 58 and an embedded license authentication system (ELAS) 60.

Alternatively, one or more of counter 56, encryption key storage module 58 and embedded license authentication system (ELAS) 60 may be located on imaging media 26, such as for example, on the silicon containing memory 33, or located at some other location in imaging device 12, or located on host 14. The decision where to locate one or more of counter 56, encryption key storage module 58 and an embedded license authentication system (ELAS) 60 may be based on, for example: the particular system within which the component(s) will be installed; whether the license is to travel with imaging device 12 or with imaging media 26; a desire to provide heightened security against physical tampering; and/or, a desire to provide heightened security against unauthorized programming access, such as by hackers.

Communications interface 50 facilitates communications with imaging driver 38 of host 14 via communications link 20 (see also FIG. 1). Embedded processor 52 is communicatively coupled to communications interface 50 via electrical path 62. Imaging recording unit interface 54 is communicatively coupled to embedded processor 52 via electrical path 64, is communicatively coupled to image recording unit 24 via electrical path 66, and is communicatively coupled to memory 33 via electrical path 68. Counter 56 is communicatively coupled to embedded processor 52 via electrical path 70, and is communicatively coupled to imaging recording unit interface 54 via electrical path 72. Embedded license authentication system (ELAS) 60 is communicatively coupled to communications interface 50 via electrical path 74, is communicatively coupled to counter 56 via electrical path 76, is communicatively coupled to image recording unit interface 54 via electrical path 78, and is communicatively coupled to encryption key storage module 58 via electrical path 80.

ELAS 60 is programmed to periodically access memory 33 of imaging media 26 and read the identification number of imaging media 26, a value representing the licensed amount of imaging substance in imaging media 26, and a value representing the amount of usage of imaging media 26. The amount of usage of imaging media 26 is tracked, and the value representing the amount of usage of imaging media 26 is periodically updated in memory 33. ELAS 60 also determines whether the usage license has expired. This determination is based on a comparison of the value representing the licensed amount of the imaging substance with the value representing the amount of usage of imaging media 26.

ELAS 60 is further programmed to facilitate the acquisition of a new license via an e-commerce transaction. To do so, ELAS 60 establishes Internet communications with licensing vendor 16 (see FIG. 1). The encryption key stored in encryption key storage module 58 is accessed and retrieved. Then, a licensing renewal request, including the identification number of imaging media 26, is generated and is encrypted with the encryption key to form encrypted license renewal request information. Of course, other information can be included as a part of the encrypted license renewal request information. The encrypted license renewal request information is then sent to licensing vendor 16 via the Internet. If licensing vendor 16 determines that the license renewal request information is valid, then licensing vendor 16 responds with the information associated with the new license, in encrypted form. ELAS 60 then decrypts the new license information, and stores information associated with the new license in memory 33. Each time ELAS 60 receives an encrypted message, the ELAS 60 will decrypt the message and perform a power-on-reset (POR) of imaging device 12. The POR, which takes several seconds to execute, will discourage hackers from breaking into the encryption system by brute force by increasing the amount of time needed to validate each key.

Figure 6:
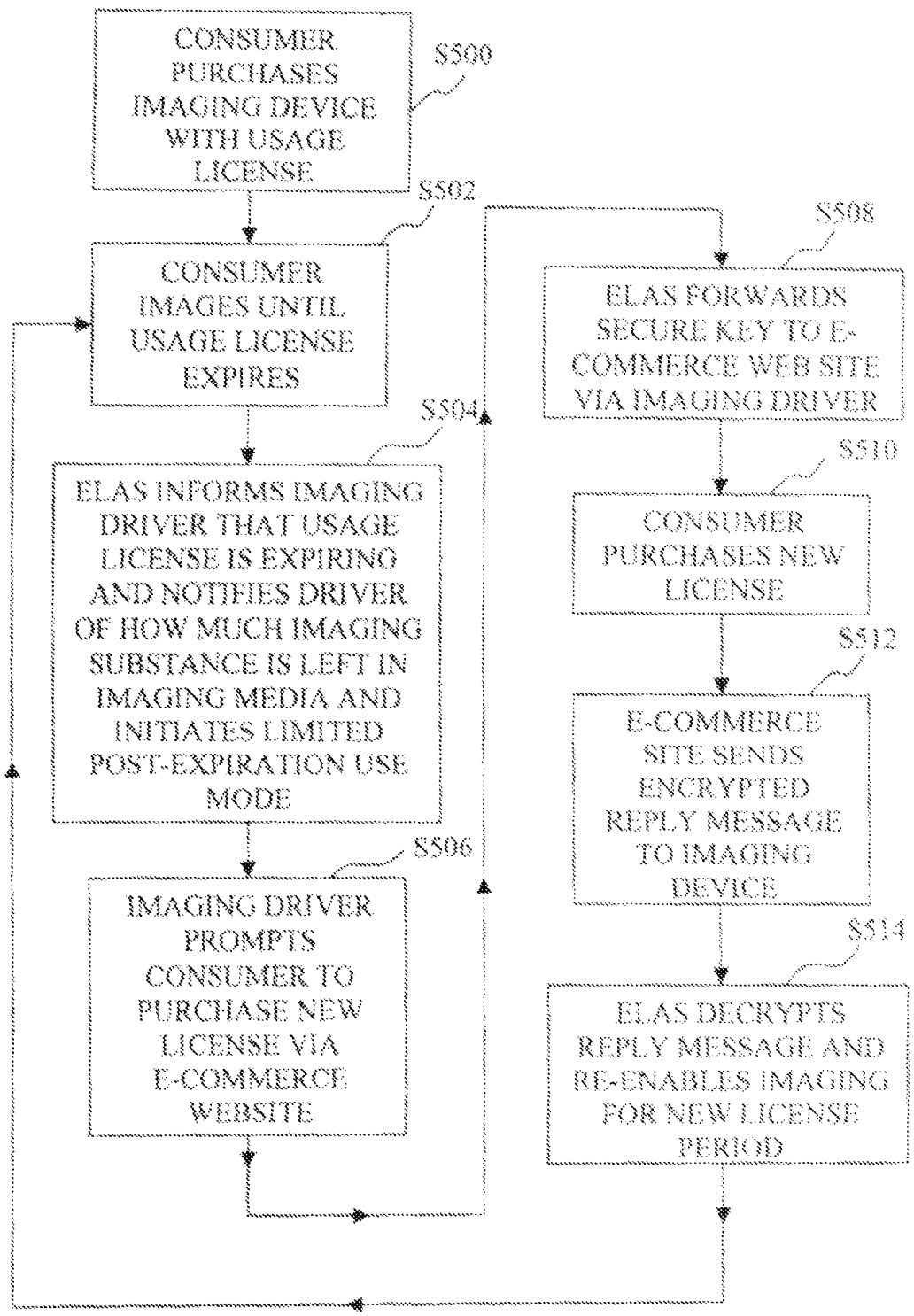
FIG. 6 is a flow chart of a consumer purchasing cycle utilizing the embedded license authentication system of the application specific integrated circuit of FIG. 5.

FIG. 6 is a flow chart of an exemplary consumer purchasing cycle utilizing the ELAS 60 of the ASIC 28 included in license monitoring mechanism 18.

At step S500, a consumer purchases imaging device 12 having associated therewith a usage license for a set amount of usage, such as for example, a set amount of imaging substance in imaging media 26, or a set amount of pages on which images can be formed. An alternative approach would be to base the usage license on a time duration.

At step S502, it is indicated that the consumer can produce images normally until the usage license expires.

At step S504, ELAS 60 sends a message to imaging driver 38 that the usage license is expiring, and indicates to imaging driver 38 the amount of imaging substance remaining in imaging media 26. Also, ELAS 60 initiates a limited post-expiration use mode. During the limited post-expiration use mode, the consumer is continually warned of the imminent ending of imaging operations due to the license expiration, such as for example, by the gradual reduction of a density of the printed images that continues until no further images can be generated. In an ink jet printer, for example, this gradual reduction of a density of the printed images may be effected by progressively reducing the number of ink jet nozzles in imaging head 29 that are available to eject ink. In an electrophotographic printer, for example, this gradual reduction of a density of the printed images may be effected by progressively reducing the power to the illuminating printhead, i.e., imaging head 29, or by progressively reducing the voltage applied to the photoconductive substrate.

At step S506, imaging driver 38 generates a warning message that prompts the consumer to purchase a new license from licensing vendor 16 via an e-commerce website of licensing vendor 16. This warning message is displayed as a text message, or an illuminated indicator, on the display 15 of host 14.

At step S508, assuming the consumer is proceeding to acquire a new license, ELAS 60 forwards a license renewal request secured by the secure encryption key stored in encryption key storage module 58 to the e-commerce website of licensing vendor 16. Included in the license renewal request, for example, is an identification of imaging device 12 and/or imaging media 26.

At step S510, assuming that licensing vendor 16 verifies the license renewal request as being legitimate, the consumer purchases the new license, such as for example, by providing credit card information to licensing vendor 16.

At step S512, licensing vendor 16 sends an encrypted reply message to imaging device 12. Included in the encrypted reply message are the specifics of the new license.

At step S514, ELAS 60 decrypts the encrypted reply message using the key stored in encryption key storage module 58, and re-enables normal imaging operations with imaging device 12 and imaging media 26 for the duration of the new license. Thereafter, the process returns to step S502.

Figure 7A:
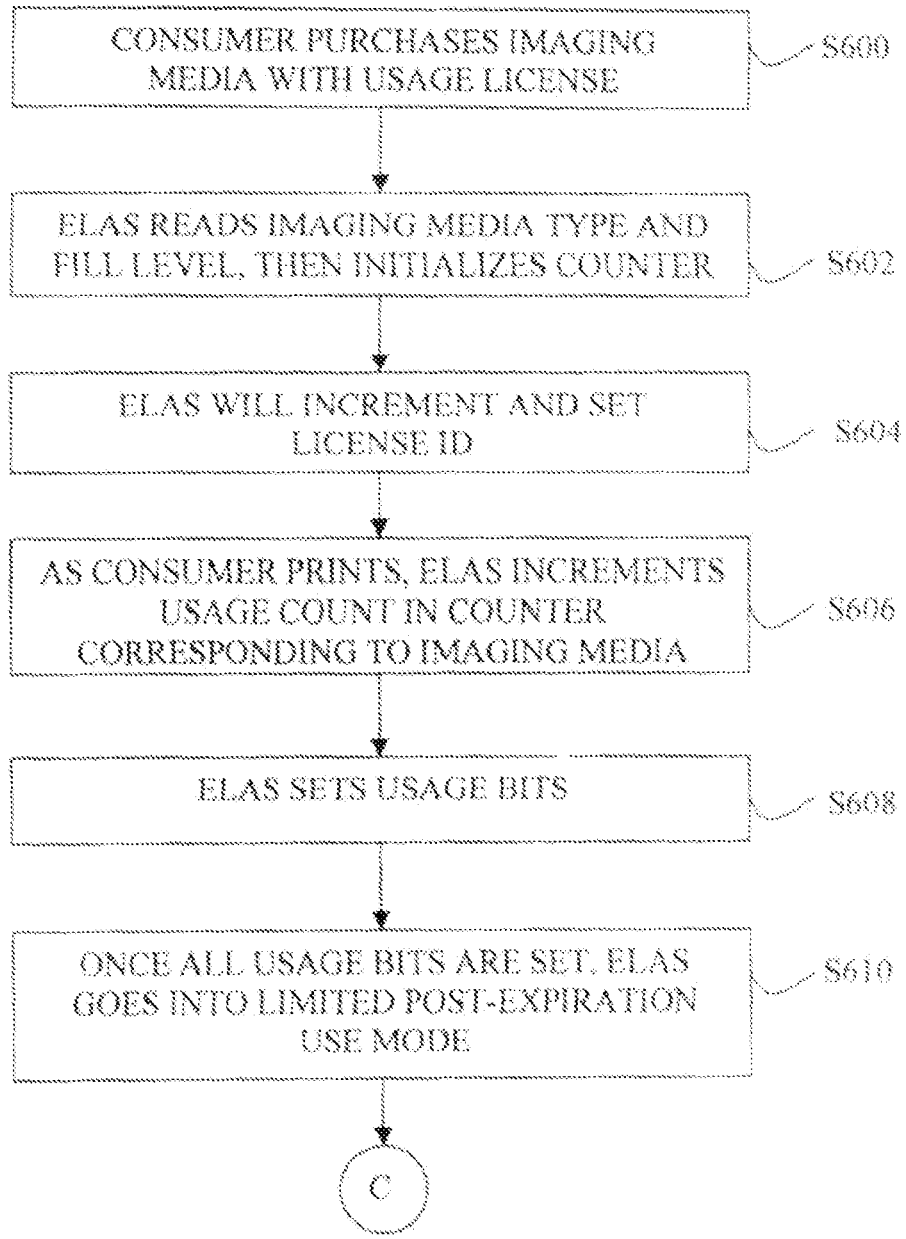
FIGS. 7A and 7B form a flowchart of the interaction between the embedded license authentication system of the application specific integrated circuit and the memory of an imaging media.
Figure 7B:
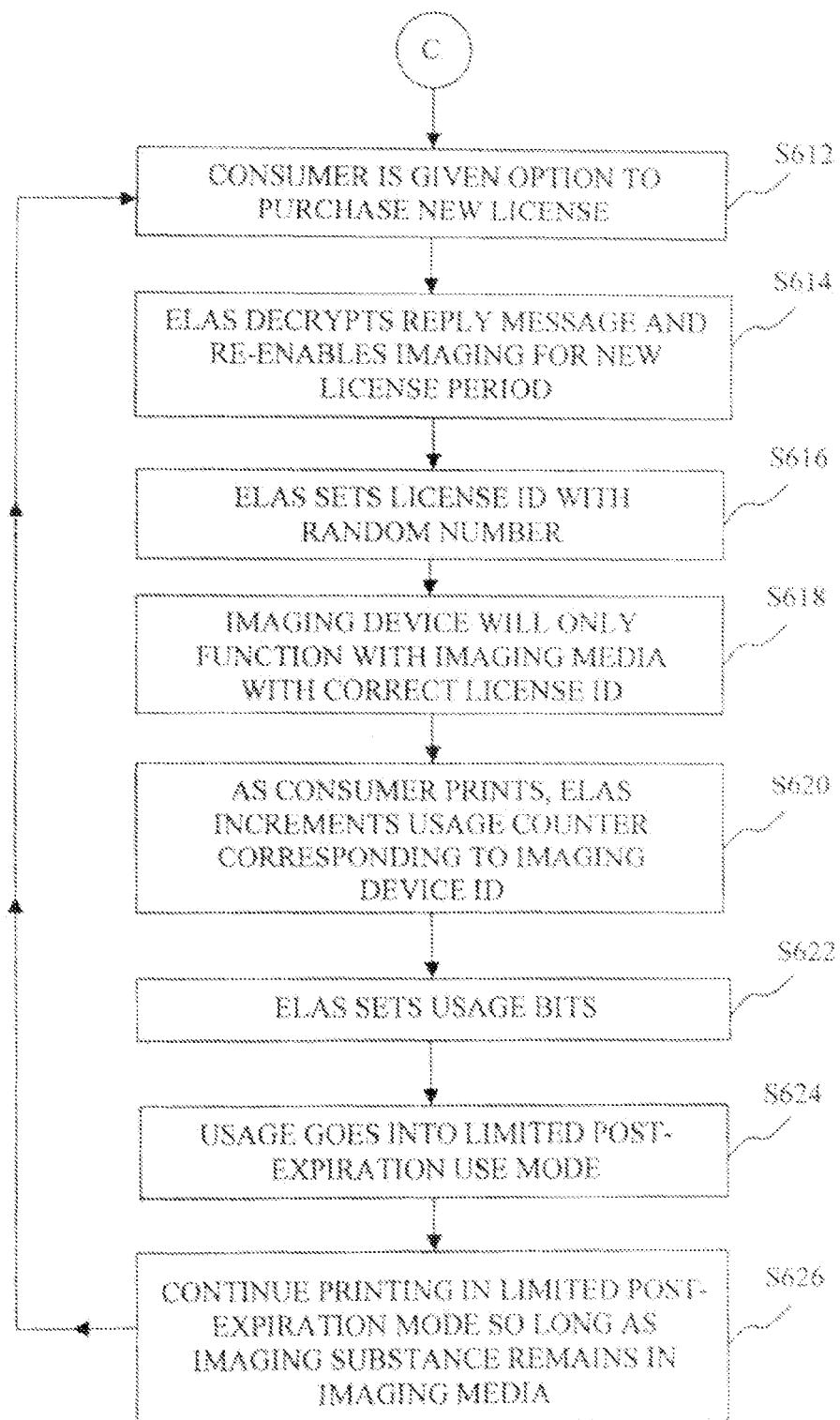

FIGS. 7A and 7B form a flowchart depicting the interaction between an embedded license authentication system, such as ELAS 60 of application specific integrated circuit 28, and the memory of an imaging media, such as memory 33 of imaging media 26.

At step S600, the consumer purchases imaging media 26 with a usage license associated with it. Imaging media 26 may be a replaceable component for use with imaging device 12. Alternatively, such a purchase may, for example, be in the form of a purchase of an imaging device, such as imaging device 12, which includes a lifetime supply of imaging substance contained in imaging media 26.

At step S602, ELAS 60 accesses memory 33 to read information associated with imaging media 26, including imaging media type and the imaging substance fill level, i.e., an initial amount of imaging substance, of imaging media 26. Counter 56 is initialized to a predefined start count.

At step S604, ELAS 60 will increment and set the license identification number (ID). For example, memory 33 of imaging media 26 includes five bits that are programmable by ELAS 60 to assign a unique ID to the license associated with imaging media 26. Alternatively, imaging media 26 may be purchased with a predefined license ID.

At step S606, during printing, embedded processor 52 receives print data from communications interface 50. Embedded processor 52 then supplies the print data to image recording unit interface 54 which is communicatively coupled to imaging recording unit 24. In turn, image recording unit interface 54 supplies print related information to ELAS 60. ELAS 60 converts this information into a usage count and increments the count maintained in counter 56. As the consumer prints, ELAS 60 will increment the count maintained in counter 56.

At step S608, once counter 56 achieves a count corresponding to a usage level, such as for example twenty percent, ELAS 60 sets the appropriate percent usage bit(s) in memory 33 of imaging media 26. Memory 33 as a plurality of usage bits, each bit representing an amount of use of imaging substance from imaging media 26. For example, each bit may represent a predefined amount of reduction in the quantity of imaging substance contained in imaging media 26. As a more particular example, the programming of one bit can represent a twenty percent usage of imaging media 26; the programming of two bits can represent a forty percent usage of imaging media 26; the programming of three bits can represent a sixty percent usage of imaging media 26; the programming of four bits can represent a eighty percent usage of imaging media 26; and the programming of five bits can represent a one-hundred percent usage of imaging media 26.

At step S610, when all usage bits are set, thereby indicating that the usage license has expired, ELAS 60 goes into a limited post-expiration use mode. ELAS 60 communicates with embedded processor 52 and imaging recording unit interface 54 to effect a gradual reduction of a density of the printed image by imaging head 29. In an ink jet printer, for example, this gradual reduction of a density of the printed images may be effected by progressively reducing the number of ink jet nozzles of imaging head 29 that are available to eject ink. In an electrophotographic printer, for example, this gradual reduction of a density of the printed images may be effected by progressively reducing the power to the illuminating printhead, i.e., imaging head 29, or by progressively reducing the voltage applied to the photoconductive substrate.

At step S612, the consumer is given the option to purchase a new license. This option may be in the form of a warning message that prompts the consumer to purchase a new license from licensing vendor 16 via an e-commerce website of licensing vendor 16. This warning message is displayed as a text message, or an illuminated indicator, on display 15 of host 14 and/or user interface 23 of imaging device 12.

At step S614, once the new license is purchased, licensing vendor 16 sends the new license in encrypted form. ELAS 60 decrypts the encrypted new license using the key stored in encryption key storage module 58, and re-enables normal imaging operations with imaging device 12 and imaging media 26 for the duration of the new license, i.e., leaves the limited post-expiration use mode and returns to a normal printing mode.

At step S616, ELAS 60 sets the license ID of imaging media 26 to a new unique identification number associated with the new license. This unique identification number, for example, may be included in a five-bit number that is randomly generated.

At step S618, if embedded processor 52 does not recognize the new license ID of imaging media 26 as a valid number, then imaging operations are halted until this discrepancy is eliminated.

At step S620, as the consumer prints, ELAS 60 increments the usage count in counter 56. This step is substantially the same as step S606 discussed above.

At step S622, once counter 56 achieves a count corresponding to a usage level, such as for example forty percent, ELAS 60 sets the appropriate percent usage bit(s) in memory 33 of imaging media 26.

At step S624, when all usage bits are set, ELAS 60 goes into the limited post-expiration use mode. ELAS 60 communicates with embedded processor 52 and imaging recording unit interface 54 to effect a gradual reduction of a density of the printed image.

At step S626, printing can continue in the limited post-expiration use mode with the continued reduction in image density so long as imaging substance is present in imaging media 26.

The process then returns to step S612. Accordingly, while in the limited post-expiration use mode, the consumer is given multiple opportunities to obtain a new license after the expiration of the current usage license.

Figure 8A:
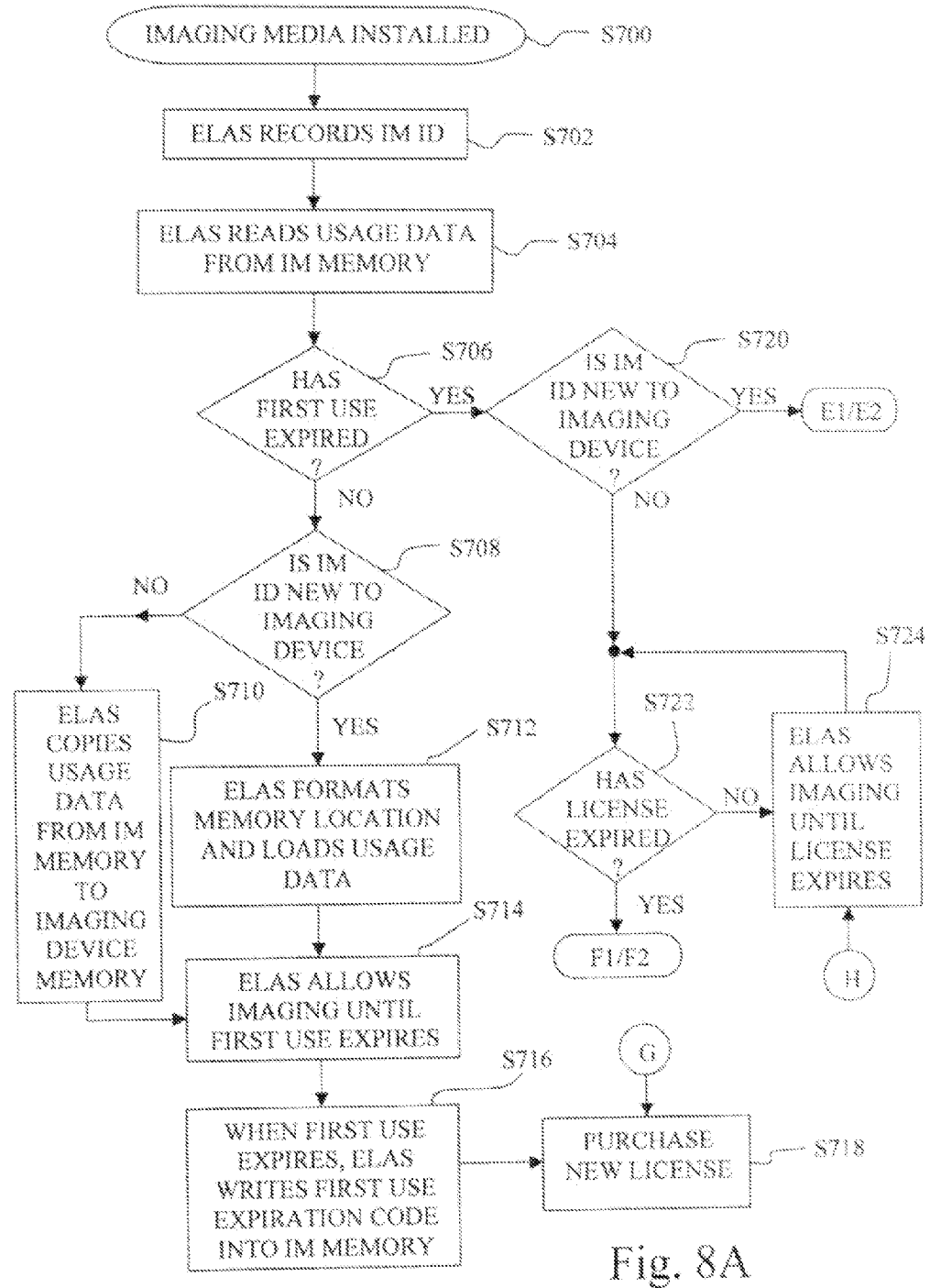
FIGS. 8A and 8B form a flowchart of one embodiment of a license authentication method of the present invention.
Figure 8B:
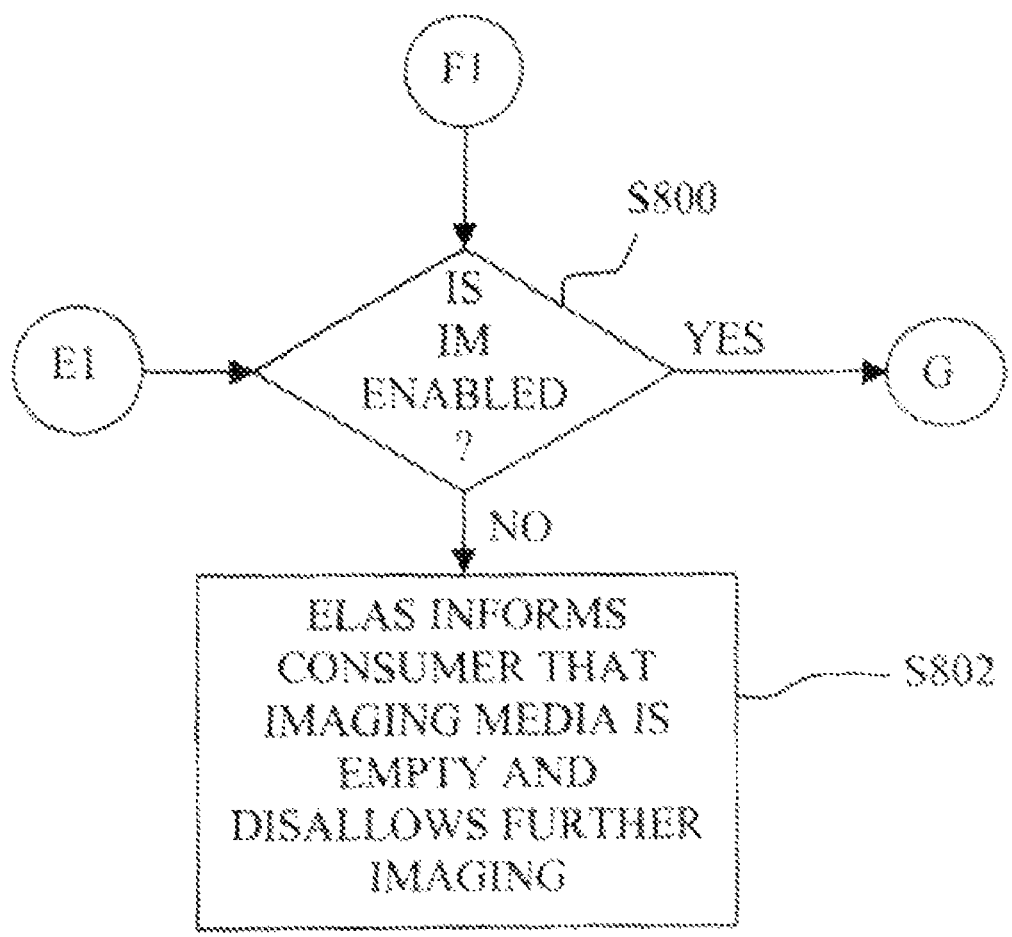
Figure 8C:
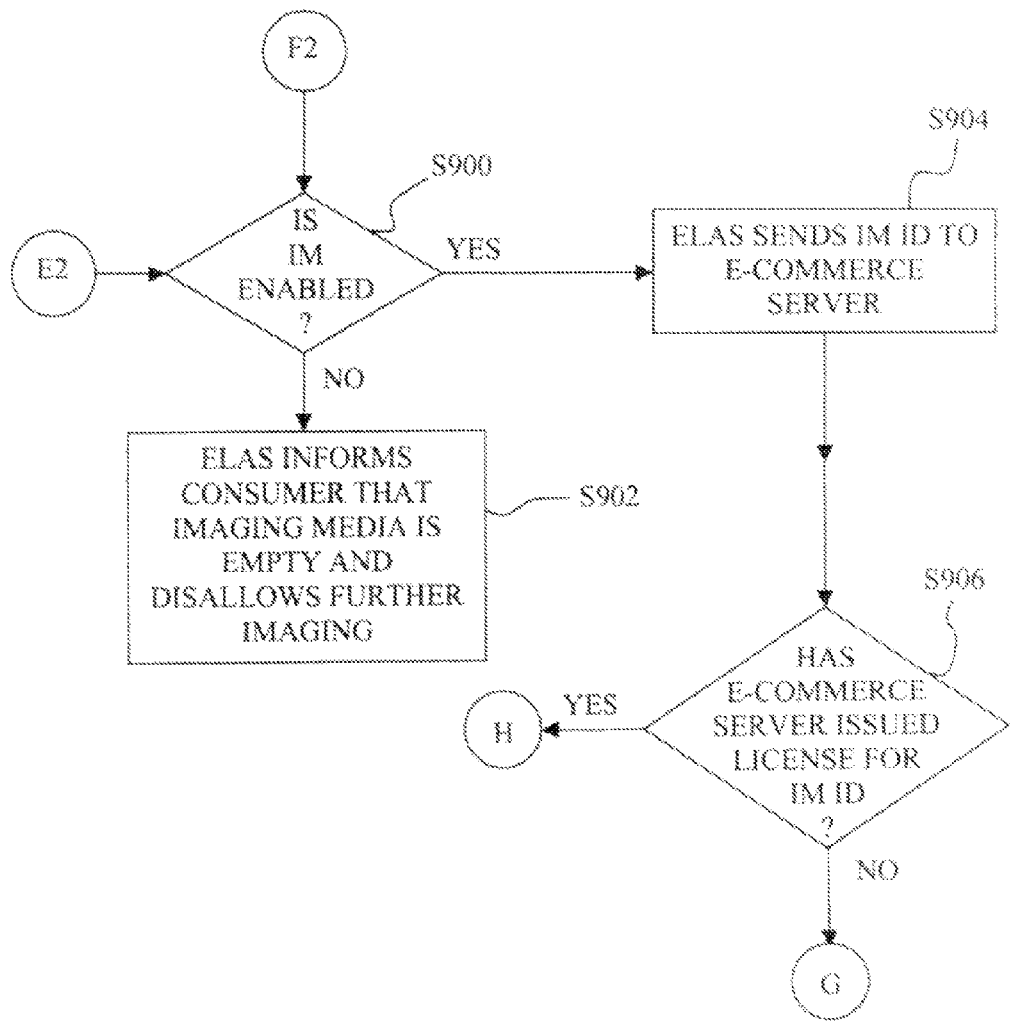

FIGS. 8A and 8B form a flowchart of an embodiment of a license authentication method of the present invention, wherein an imaging media, such as imaging media 26, is bound to a particular imaging device, such as imaging device 12. FIGS. 8A and 8C form a flowchart of another embodiment of a license authentication method of the present invention, wherein an imaging media, such as imaging media 26, is not bound to a particular imaging device and can be installed in any imaging device, including imaging device 12, that can facilitate its installation. Thus, FIG. 8A is common to each of these embodiments. With respect to the flowchart blocks of FIGS. 8A, 8B and 8C, the abbreviation IM is used to refer to the imaging media, and the abbreviation ID is used to refer to identification.

At step S700, it is determined that imaging media 26 has been installed in imaging device 12.

At step S702 embedded license authentication system (ELAS) 60 records the imaging media ID of imaging media 26 in memory of imaging device 12, such as in embedded processor 52, the imaging media ID having been previously stored in memory 33 of imaging media 26. An imaging device ID unique to imaging media 26 may, for example, be written to memory 33 at the time of manufacture of imaging media 26 and/or written to memory on an ink jet printhead serving as imaging head 29. Alternatively, imaging device 12 could write into memory 33 a unique imaging device ID when a new imaging media is installed in imaging device 12. Further, the unique imaging device ID could be generated by imaging device 12, or by the e-commerce server of licensing vendor 16, at the time of license purchase, and then written to the imaging media memory, such as memory 33, by imaging device 12

At step S704 ELAS 60 reads imaging media usage data stored in memory 33 of imaging media 26. The usage data is an indication of an amount of usage, for example the amount of imaging substance depletion, of imaging media 26. Such usage data may be, for example, in the form of a count value, such as for example, the number of ink jet nozzle firings.

At step S706, ELAS 60 determines whether a first use of imaging media 26 has expired. By the term "first use", it is meant that no license renewal has occurred for that particular imaging media 26.

If, at step S706, the determination is NO, then the process proceeds to step S708 to determine whether the imaging media ID is new to imaging device 12.

If, at step S708, the determination is NO, then the process proceeds to step S710.

At step S710, ELAS 60 copies the usage data stored in memory 33 to the allocated memory of imaging device 12, such as in ASIC 28. The process then continues to step S714.

If, at step S708, the determination is YES, then the process proceeds to step S712.

At step S712, ELAS 60 formats the allocated memory of imaging device 12, such as in ASIC 28, and stores the usage data in the allocated memory.

At step S714, ELAS 60 allows imaging until it is determined that the first use has expired.

At step S716, when the first use has expired, ELAS 60 writes a first use expiration code to memory 33 of imaging media 26.

At step S718, the consumer is instructed to purchase a new usage license through licensing vendor 16, such as through an e-commerce server of licensing vendor 16. When the license is purchased through the e-commerce server of licensing vendor 16, the e-commerce server of licensing vendor 16 can keep a database of licensed imaging media, such as imaging media 26, through recordation of a license identification and the associated imaging media ID.

Returning now to decision step S706, if the determination is YES, the first use has expired, i.e., the first use expiration code has been written to memory 33 of imaging media 26, and the process proceeds to step S720.

At step S720, it is determined whether the imaging media ID is new to imaging device 12.

If, at step S720, the determination is YES, the process proceeds through path E1 to step S800 of FIG. 8B if the system is designed such that imaging media 26 is bound to imaging device 12, or alternatively, the process proceeds through path E2 to step S900 of FIG. 8C if the system is designed such that imaging media 26 is not bound to imaging device 12. Each of FIGS. 8B and 8C will be discussed in detail below.

If, at step S720, the determination is NO, the process proceeds to step S722 to determine whether the license has expired.

If, at step S722, the determination is NO, then the process proceeds to step S724, wherein ELAS 60 allows imaging until the license has expired.

If, at step S722, the determination is YES, the license has expired, the process proceeds through path F1 to step S800 of FIG. 8B if the system is designed such that imaging media 26 is bound to imaging device 12, or alternatively, the process proceeds through path F2 to step S900 of FIG. 8C if the system is designed such that imaging media 26 is not bound to imaging device 12.

As indicated above, the process of FIG. 8B is executed if the system is designed such that imaging media 26 is bound to imaging device 12.

At step S800, it is determined whether imaging media 26 is enabled.

If, at step S800, the determination is YES, then the process proceeds to step S718 of FIG. 8A, wherein the consumer is instructed to purchase a new license through licensing vendor 16, such as through an e-commerce server of licensing vendor 16.

If, at step S800, the determination is NO, then the process proceeds to step S802.

At step S802, ELAS 60 informs the consumer that imaging media 26 is empty, and that further imaging is disallowed. The disallowing of imaging can be effected, for example, by setting a bit in memory 33 of imaging media 26, wherein imaging device 12 examines the bit during a power on reset (POR) of imaging device 12.

Also, as indicated above, the process of FIG. 8C is executed if the system is designed such that imaging media 26 is not bound to imaging device 12.

At step S900, it is determined whether imaging media 26 is enabled.

If, at step S900, the determination is NO, then the process proceeds to step S902.

At step S902, ELAS 60 informs the consumer that imaging media 26 is empty, and that further imaging is disallowed. The disallowing of imaging can be effected, for example, by setting a bit in memory 33 of imaging media 26, wherein imaging device 12 examines the bit during a power on reset (POR) of imaging device 12.

If, at step S900, the determination is YES, then the process proceeds to step S904.

At step S904, ELAS 60 sends the imaging device ID to the e-commerce server of licensing vendor 16. The process then proceeds to step S906.

At step S906, the e-commerce server of licensing vendor 16 accesses its database to determine whether a license has been issued corresponding to the imaging device ID of imaging media 26.

If, at step S906, the determination is YES, then the process returns to step S724 of FIG. 8A, wherein ELAS 60 allows imaging until the license has expired.

If, at step S906, the determination is NO, then the process proceeds to step S718 of FIG. 8A, wherein the consumer is instructed to purchase a new license through licensing vendor 16, such as through the e-commerce server of licensing vendor 16.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An imaging device, comprising:
an electronics unit;
an imaging recording unit communicatively coupled to said electronics unit; and
an imaging media carrying a supply of imaging substance, said imaging media including a memory, said memory being communicatively coupled to said electronics unit, said memory including storage locations for storing an identification number of said imaging media, a first value representing a licensed amount of the imaging substance and a second value representing an amount of usage of imaging media; said electronics unit including:
a communications interface for facilitating communications with an imaging device driver;
a controller communicatively coupled to said communications interface;
an imaging recording unit interface communicatively coupled to each of said controller, said imaging recording unit and said memory;
a counter communicatively coupled to each of said controller and said imaging recording unit interface;
an encryption key storage module; and
an embedded license authentication system communicatively coupled to each of said communications interface, said counter, said imaging recording unit interface and said encryption key storage module, said embedded license authentication system being programmed for performing the steps of:
accessing said memory of said imaging media and reading said identification number for said imaging media, said first value and said second value;
tracking said amount of usage of said imaging media; and
determining whether a usage license has expired, said determining being based on a comparison of said first value representing said licensed amount of said imaging substance with said second value representing said amount of usage of said imaging media.

2. The imaging device of claim 1, said embedded license authentication system being further programmed to perform the step of facilitating acquisition of a new license via an e-commerce transaction.

3. The imaging device of claim 2, wherein said facilitating acquisition comprises the steps of:
establishing Internet communications with a licensing vendor;
accessing an encryption key stored in said encryption key storage module; generating a license renewal request including said identification number of said imaging media, and encrypting said license renewal request with said encryption key to form encrypted license renewal request information;
sending said encrypted license renewal request information to said licensing vendor;
receiving new license values associated with said new license.

4. The imaging device of claim 3, wherein said new license is received in an encrypted message, and said imaging device performing a power-on reset upon receiving any encrypted message.

5. The imaging device of claim 1, wherein said electronics unit an application specific integrated circuit.

* * * * *